United States Patent
Gu et al.

(10) Patent No.: US 8,547,979 B2
(45) Date of Patent: Oct. 1, 2013

(54) IP FRAGMENTATION IN GTP TUNNEL

(75) Inventors: Wei Gu, Shanghai (CN); Lei Guo, Shanghai (CN); Xiao Li, Shanghai (CN); Di Liu, Shanghai (CN); Lirong Sun, Shanghai (CN); Qi Xia, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 104 days.

(21) Appl. No.: 12/980,605

(22) Filed: Dec. 29, 2010

(65) Prior Publication Data

US 2012/0155460 A1    Jun. 21, 2012

(30) Foreign Application Priority Data

Dec. 21, 2010  (WO) ................ PCT/CN2010/002102

(51) Int. Cl.
*H04L 12/28*    (2006.01)
*H04L 12/56*    (2011.01)

(52) U.S. Cl.
USPC ........................................ 370/394

(58) Field of Classification Search
USPC ................. 370/389–394, 395.1, 473, 474
See application file for complete search history.

(56) References Cited

U.S. PATENT DOCUMENTS

| | | | |
|---|---|---|---|
| 2004/0008664 A1* | 1/2004 | Takahashi et al. | 370/351 |
| 2006/0262808 A1* | 11/2006 | Lin et al. | 370/466 |
| 2007/0217424 A1* | 9/2007 | Kim et al. | 370/392 |
| 2008/0107026 A1* | 5/2008 | Backman | 370/235 |
| 2011/0090851 A1* | 4/2011 | Khalil et al. | 370/328 |
| 2011/0243063 A1* | 10/2011 | Kuningas | 370/328 |

OTHER PUBLICATIONS

3GPP TS 29.061 V9.4.0, Technical Specification, 3rd Generation Partnership Project; Technical Specification Group Core Network and Terminals; "Interworking between the Public Land Mobile Network (PLMN) Supporting Packet Based Services and Packet Data Networks (PDN)" (Release 9) (Sep. 2010).

* cited by examiner

*Primary Examiner* — Chuong T Ho
(74) *Attorney, Agent, or Firm* — Nixon & Vanderhye, P.C.

(57) ABSTRACT

For improved IP fragmentation and transmission, user payload is transmitted through a transmission path enabled by at least a first established tunnel (17,18) and a second (17,18) established tunnel. The tunnels connect a first node (11, 13) and a second (11,13) node in a Packet Core Network (PCN). A method comprises the first node fragmenting (19) at least one received payload packet (15) into fragments (16) on the basis of a minimum Maximum Transmission Unit (MTU) for an upper IP layer of the transmission path; encapsulating (20) the fragments at the entry of the first tunnel, and, determining (21) the MTU for the upper IP layer of the transmission path on the basis of an MTU of a lower IP layer of the transmission path and on the basis of the size of at least one additional tunnel header for the encapsulated fragments (16).

14 Claims, 4 Drawing Sheets

IP FRAGMENTATION IN GTP TUNNEL

This application claims priority of PCT Application No. PCT/CN2010/002102, filed Dec. 21, 2010, the entire contents of each of which are hereby incorporated by reference.

TECHNICAL FIELD

The technology disclosed hereintechnology disclosed herein relates to a method for improving IP fragmentation and transmission of user payload between a User Equipment (UE) and a Peer Node (PN). The technology disclosed herein also relates to a first node and a packet core network adapted for the same purpose.

BACKGROUND

In Packet Core Networks (PCN) the transmitted user payload will be encapsulated and de-encapsulated by adding and removing GPRS Tunneling Protocol (GTP) header. Two consequent GTP tunnels, between the eNodeB and the Serving Gateway (S-GW) and between the S-GW and the PDN Gateway (P-GW) need to be established to successfully transmit packets between the User Equipment (UE) and the Packet Data Network (PDN) while the S-GW acts as the intermediary between the two tunnels.

When the IP packet of user payload is big enough, the final IP packet size after encapsulation could exceed the allowed value. An example of the allowed value is a Maximum Transmission Unit (MTU) of 1500 bytes. As a result of the MTU limit, the payload has to be fragmented among eNodeB, S-GW and P-GW in the transmission path. The minimum MTU of a layer refers to the size of the largest protocol data unit that the layer can pass onwards. In the PCN, this relates to the transmission capacity between two nodes, such as between the eNodeB and the S-GW.

Currently, eNodeB, S-GW, and P-GW reuse standard IP fragmentation mechanism, i.e., the fragmented packets will be reassembled at IP level, and then processed at user space for GTP tunneling. All of eNodeB, S-GW and P-GW will have to perform this reassembling and fragmentation, if unfortunately large packets, called "jumbo packet" arrive.

Looking at uplink data transmission (data originating from the UE), the first fragmentation begins at the entry of the first tunnel (between the eNodeB and the S-GW). For downlink, data first tunnel would instead be the tunnel between the P-GW and the S-GW. The data for uplink may be fragmented again and sent out at the end of the second tunnel (between S-GW and P-GW). In eNodeB/S-GW/P-GW, each network element will reassemble the IP packet to get the full data and then establish a GTP tunnel to send the data to the next network element. Both the IP header and data will be tunneled by GTP. From the fragmentation process, it can be deduced that in the worst condition, the time for fragmentation handling along the transmission path, involving eNodeB/S-GW/P-GW, is:

> T(eNodeB/P-GW fragmentation)+
> T(S-GW reassembly)+ T(S-GW fragmentation)+
> T(P-GW/eNodeB reassembly)+
> T(P-GW/eNodeB fragmentation)

Obviously, it can be seen that too much fragmentation plus reassembly may be involved in the GTP tunnel transmission path. As a result, the performance is impacted badly. Besides, when there is large number of fragments in the network, fragmentation and reassembly will consume much effort of kernel IP resources, and do harm to the network throughput.

There is a Change Request, CR, for 29.061 in 3GPP, including a proposal to use MTU discovery to find a minimum MTU along the transmission path. Each network node can use this MTU to detect and make IP fragmentation, as it will avoid extra IP fragmentation along the path. The Mobile Station/User Equipment, or a server in an external IP network, may find out the end-to-end MTU by path MTU discovery and hence fragment correctly already at the source.

However, in the proposal according to the Change Request, IP fragmentation still happens if packet size exceeds MTU. Meanwhile, some upper layer protocol, such as TCP MSS (Maximum Segment Size), provides mechanism for segmentation negotiation. This can prevent IP fragmentation, but it is not common for other upper layer protocols.

SUMMARY

The technology disclosed herein provides a method to avoid any IP fragmentation along a transmission path between the eNodeB and the P-GW in a PS network.

The technology disclosed herein provides a method for improving IP fragmentation and transmission of user payload between a User Equipment (UE) a Peer Node (PN). The payload is transmitted through a transmission path enabled by at least a first and a second established tunnel, said tunnels connecting a first and a second node in a Packet Core Network (PCN). The method comprises the steps of:

The first node fragments at least one received payload packet into fragments on the basis of a minimum Maximum Transmission Unit (MTU) for an upper IP layer of the transmission path.

What particularly characterizes the method is that it further comprises a step where the first node determines the MTU for the upper IP layer of the transmission path on the basis of an MTU of a lower IP layer of the transmission path and on the basis of the size of at least one additional tunnel header for the encapsulated fragments.

The technology disclosed herein also provides a first node being adapted to improve IP fragmentation and transmission of user payload between a User Equipment (UE) and a Peer Node (PN). The payload is transmitted through a transmission path enabled by at least a first and a second established tunnel, said tunnels connecting the first and a second node in a Packet Core Network (PCN). The first node further is adapted to fragment at least one received payload packet into fragments on the basis of a minimum Maximum Transmission Unit (MTU) of an upper IP layer of the transmission path. The first node is further adapted to encapsulate said fragments at the entry of the first tunnel.

What particularly characterizes the technology disclosed herein is that the first node further is adapted to determine the MTU of the upper IP layer of the transmission path on the basis a MTU of a lower IP layer in the transmission path and the size of at least one additional tunnel header for the encapsulated fragments.

The technology disclosed herein also provides a packet core network (PCN) adapted to improve IP fragmentation and transmission of user payload between a User Equipment (UE) and a Peer Node (PN). The PCN comprises a first node.

The main advantage with the technology disclosed herein is that fragmentation handling time is reduced due to the less number of fragmentation operations performed. If the tunneled IP fragmentation is performed at the entry of the $1^{st}$ tunnel, i.e., by eNodeB or P-GW, in the left tunnel edge nodes, no IP fragmentation will be performed. Moreover, the IP fragmentation process is also not needed in the transit routers along the transmission path, since each packet is in smaller size. As a result, the performance of the whole network will be improved.

BRIEF DESCRIPTION OF THE DRAWINGS

The technology disclosed herein will be described in greater detail in the following, with reference to the embodiments that are shown in the attached drawings, in which.

DETAILED DESCRIPTION

The technology disclosed herein relates to a method for improving IP fragmentation and transmission of user payload between a User Equipment (UE) and a Peer Node (PN). The payload is transmitted through a transmission path enabled by at least a first and a second established tunnel, said tunnels connecting a first and a second node in a Packet Core Network (PCN). A person skilled in the art would realize that a first node and a PCN, adapted to perform said method described below are also disclosed in the following. The PCN will not be described in any further detail.

Figure 1:
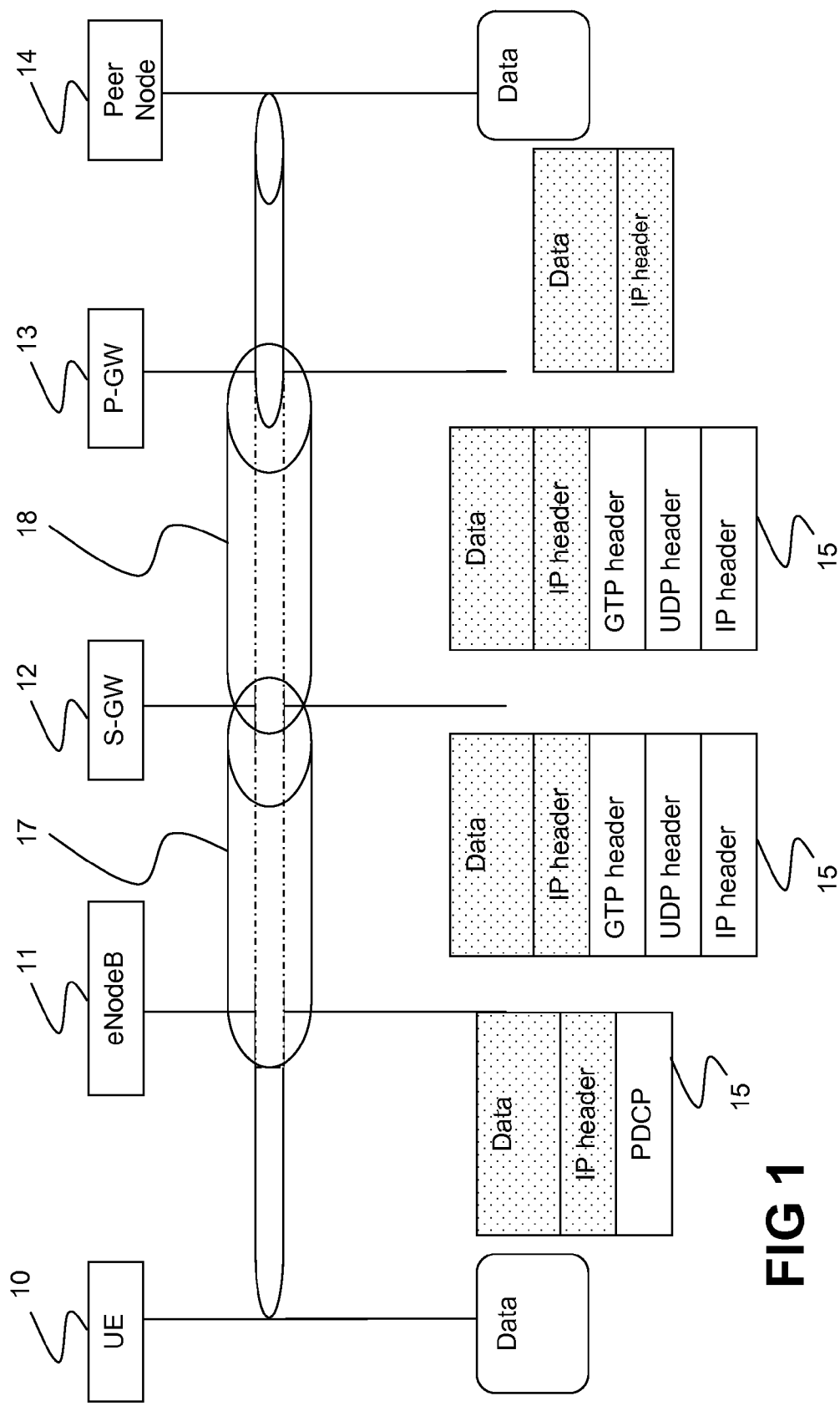
FIG. 1 illustrates IP packeting through GTP tunnelling.

FIG. 1 illustrates an example of IP packeting through GTP tunnelling. The PCN comprises an UE 10, an eNodeB 11, a Serving Gateway 12 (S-GW), and a PDN-Gateway 13 (P-GW). The first node will in the following be exemplified by the eNodeB and the second node by the P-GW.

As shown in FIG. 1, data packets 15 are transmitted through a path formed by a first tunnel 17 extending between the eNodeB and the S-GW and a second tunnel 18 extending between the S-GW and the P-GW. Thereby, payload data can be routed uplink from the UE to a Peer Node 14 (PN) outside the PCN. As shown, the packets received by the eNodeB comprise an IP header with information about the packet and Packet Data Conergence Protocol (PDCP).

The transmitted user payload is encapsulated and de-encapsulated in the user plane by adding and removing a GPRS Tunneling Protocol (GTP) header. The User Data Protocol (UDP) and the IP header for the GTP protocol are also added and removed in the user plane to the user payload. The two GTP tunnels 17/18, between the eNodeB 11 and the S-GW 12, and between the S-GW and the P-GW 13, need to be established to successfully transmit the packets between the User Equipment (UE) and the Packet Data Network, PDN. The S-GW acts as the intermediary between the two tunnels.

Figure 2:
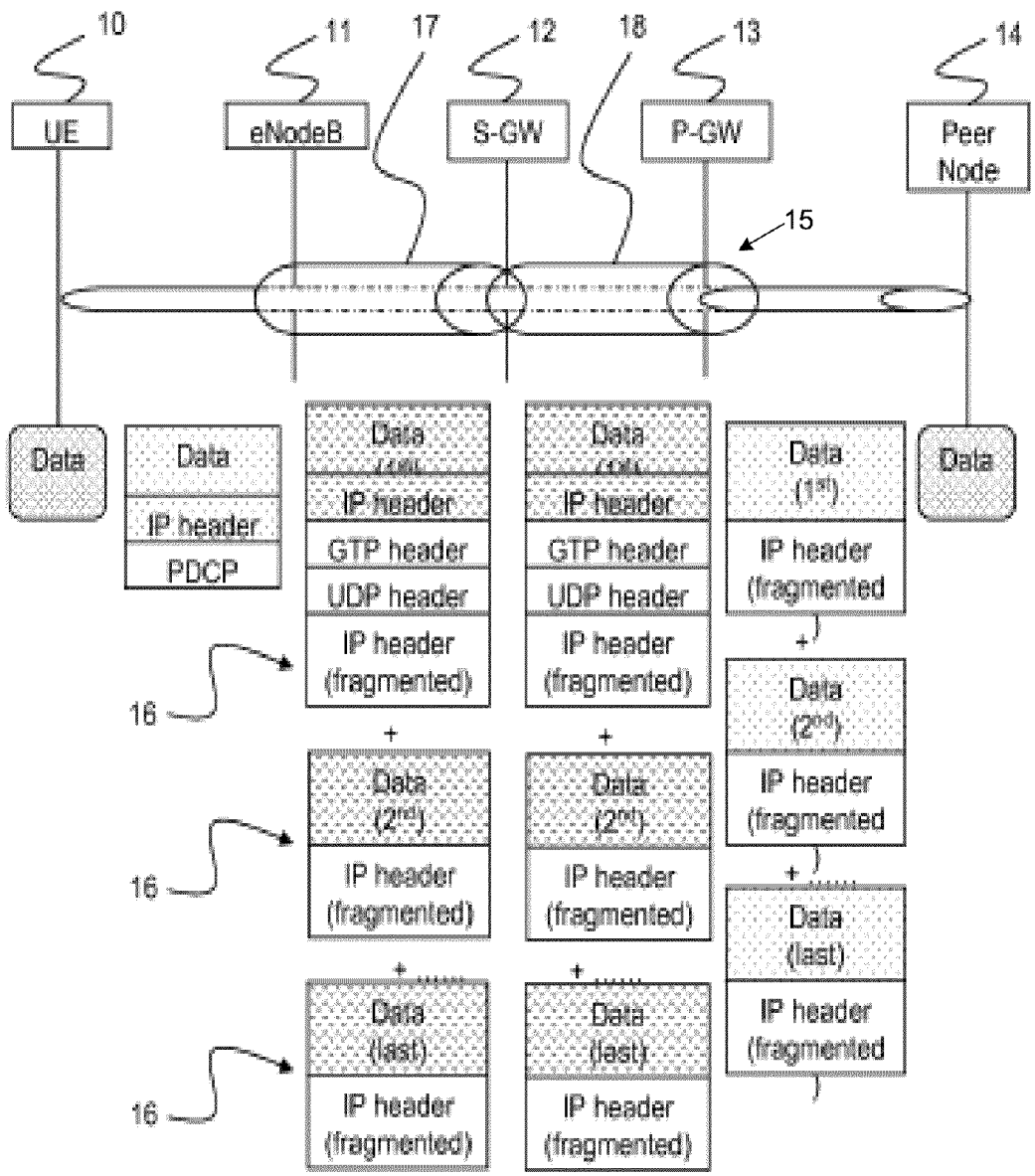
FIG. 2 illustrates a known solution for fragmentation during the GTP transmission path.

FIG. 2 illustrates an example of a known solution for fragmentation during the GTP transmission path. The encapsulation and de-encapsulation is performed in the same way as in FIG. 1. As shown in the F*ig*. 2, the eNodeB 11 fragments at least one received payload (named Data in FIG. 2) packet 15 into fragments 16. The fragmenting is performed on the basis of a minimum Maximum Transmission Unit (MTU) of the transmission path. The eNodeB further encapsulates said fragments at the entry of the first tunnel 17.

The minimum MTU of a layer refers to the size of the largest protocol data unit that the layer can pass onwards. In the PCN, this relates to the transmission capacity between two nodes, such as between the eNodeB 11 and the S-GW 12 in the transmission path. The upper IP layer is for instance the user plane.

The nodes eNodeB 11, S-GW 12, and P-GW 13 in FIG. 2 reuse standard IP fragmentation mechanism, i.e., the fragmented packets will be reassembled at IP level, and then processed at user space for GTP tunneling. All of eNodeB, S-GW and P-GW will have to perform this reassembling and fragmentation if unfortunately large packets called "jumbo packet" arrives.

The first fragmentation begins at the entry of the first tunnel (between eNodeB and S-GW) and may be fragmented again and sent out at the end of the second tunnel (between S-GW and P-GW). In eNodeB/S-GW/P-GW, each network element will reassemble the IP packet to get the full data and then establish a GTP tunnel to send the data to the next network element. This known procedure for fragmentation result in that many fragmentations and reassemblies are involved in the GTP tunnel transmission path. This takes a lot of time and the performance is impacted badly. Besides, when there is large number of fragments in the network, fragmentation and reassembly will consume much effort of kernel IP resources, and do harm to the network throughput.

The technology disclosed herein intends to avoid this problem by providing a method to avoid any IP fragmentation along a transmission path between the eNodeB and the P-GW in a PS network. In the technology disclosed herein the eNodeB 11 therefore determines (see step 21 in FIG. 4) the MTU of the transmission path on the basis of an MTU of a lower IP layer of the transmission path and on the basis of the size of at least one additional tunnel header for the encapsulated fragments.

Figure 4:
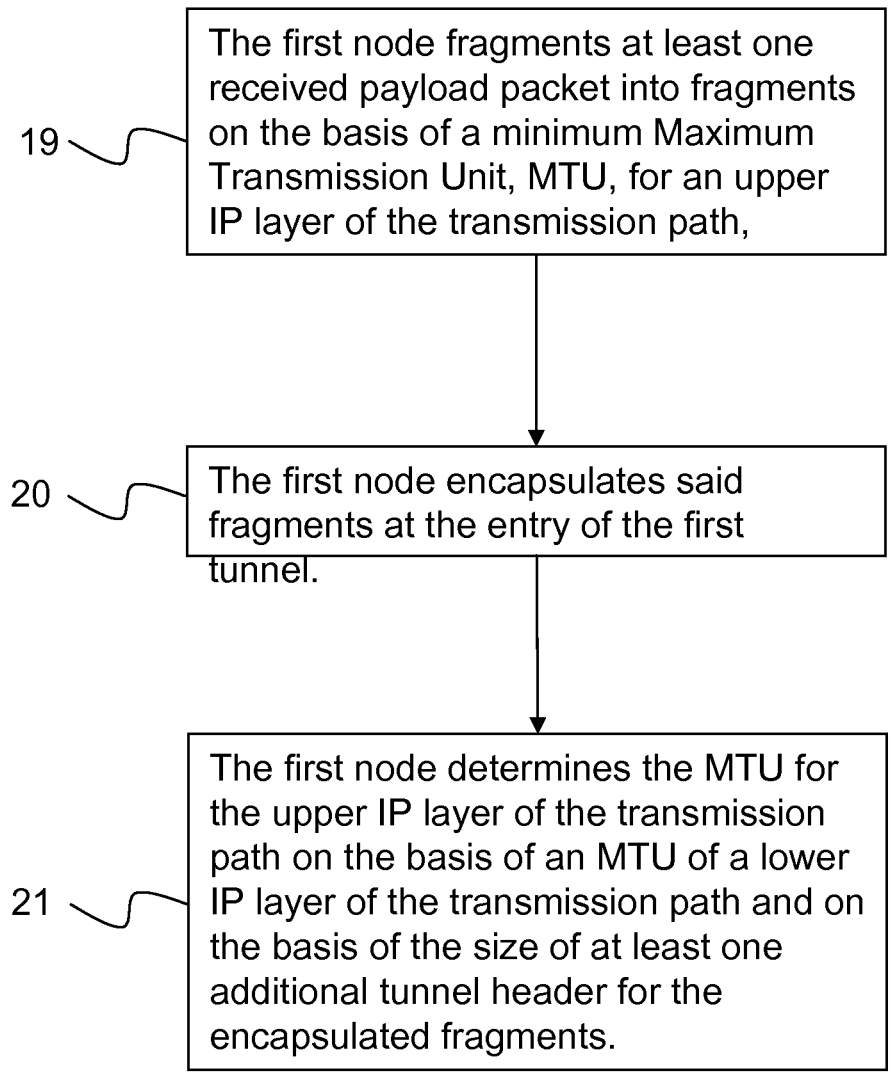
FIG. 4 illustrates a method for payload transmission in a PS network.

FIG. 4 illustrates the method according to the technology disclosed herein. The two steps 19 and 20 of FIG. 4 have been described earlier in reference to FIG. 2.

The MTU of the transmission path is in the technology disclosed herein calculated as a "virtual MTU", which can be used as basis for the fragmentation. By "virtual" is meant an MTU for an upper IP layer. This is not really an MTU since the MTU is defined as the size of the largest protocol data unit that a lower IP layer can pass onwards. The upper layer is preferably the user plane and the lower layer Kernel space.

In particular, the MTU is calculated as the MTU of the lower IP layer minus the size of the additional tunnel header. This can also be expressed as:

The size of "virtual MTU"=The MTU of lower IP layer−The size of additional headers Additional headers are in GTP (see FIGS. 1 and 2):

Tunneling IP header+UDP header+GTP header+ Potential GTP-U extension length(and/or potential other tunnel header length)

Both IPv4 and IPv6 are applicable. The nodes along the transmission path may have the same MTU. Otherwise, the MTU of the lower IP layer consist in the lowest MTU of the network nodes along the transmission path. In order to determine the lowest MTU, an MTU discovery procedure may be invoked.

If the size of received IP packet at the edge nodes, the eNodeB 1 and P-GW 13, which will be tunneled by GTP-U, is bigger than the "virtual MTU", the edge nodes will apply IP fragmentation function firstly, then encapsulate the fragments into GTP-U or potential other tunnels. The packets are fragmented at tunnelled IP level.

Using the method according to the technology disclosed herein, fragmentation handling time can be reduced. The reason is that, due to a MTU determination where both the MTU of a lower IP layer and the size of additional tunnel headers are removed, it is ensured that the lowest MTU of the complete transmission path is determined. This results in that less fragmentation operations need to be performed. Fragmentation is only performed at the entrance of the first tunnel 17. Therefore, the total time for fragmentation processing during GTP tunnel transmission will be:

T(eNodeB/P-GW fragmentation)

The intuitive idea of the technology disclosed herein is therefore to improve IP fragmentation in tunnelling, preferably GTP tunnelling, from two aspects:
1. Reducing the number of fragmentations and reassemblies.
2. Reducing the number of encapsulations and de-encapsulations.

Moreover, the IP fragmentation process is not needed in transit routers along the transmission path, since each packet is in a smaller size. As a result, the performance of the whole network will be improved.

Although less fragmentation is performed, there is more GTP tunneling operation for the IP fragments. The reason is that each IP fragment needs GTP tunneling and is being sent out. However, with IP fragmentation according to prior art, IP stack must wait until all fragments arrive in order to make reassembly. This result in that time is delayed, and as a result the network throughput is badly impacted.

Another advantage with the technology disclosed herein is that standard IP fragmentation can be combined with the new procedure for determining MTU. The tunneled IP fragmentation follows the standard IP fragmentation process, i.e., each fragment contains valid IP header and IP data. The fragments are linked by the fragmentation information in the IP header. After the fragmentation, each tunneled IP fragment is packaged into GTP tunnel by the S-GW 12 independently (see FIG. 3) and sent to the next tunneling edge. Finally at the end of the second tunnel, the tunnel edge node (eNodeB or P-GW) removes the GTP header and routes all the fragmented IP data to the Peer Node 14. They actually appear as normal fragmented IP belonging to the same transaction and can be handled correctly by the peer node.

The fragments delivered after two tunnels are passed are normal IP packets, with link information in the IP header (i.e., Identification, fragment offset, flags). Thus in the destination node, all fragments can be reassembled correctly using the standard reassembly way. This can be handled automatically by kernel IP stack.

Figure 3:
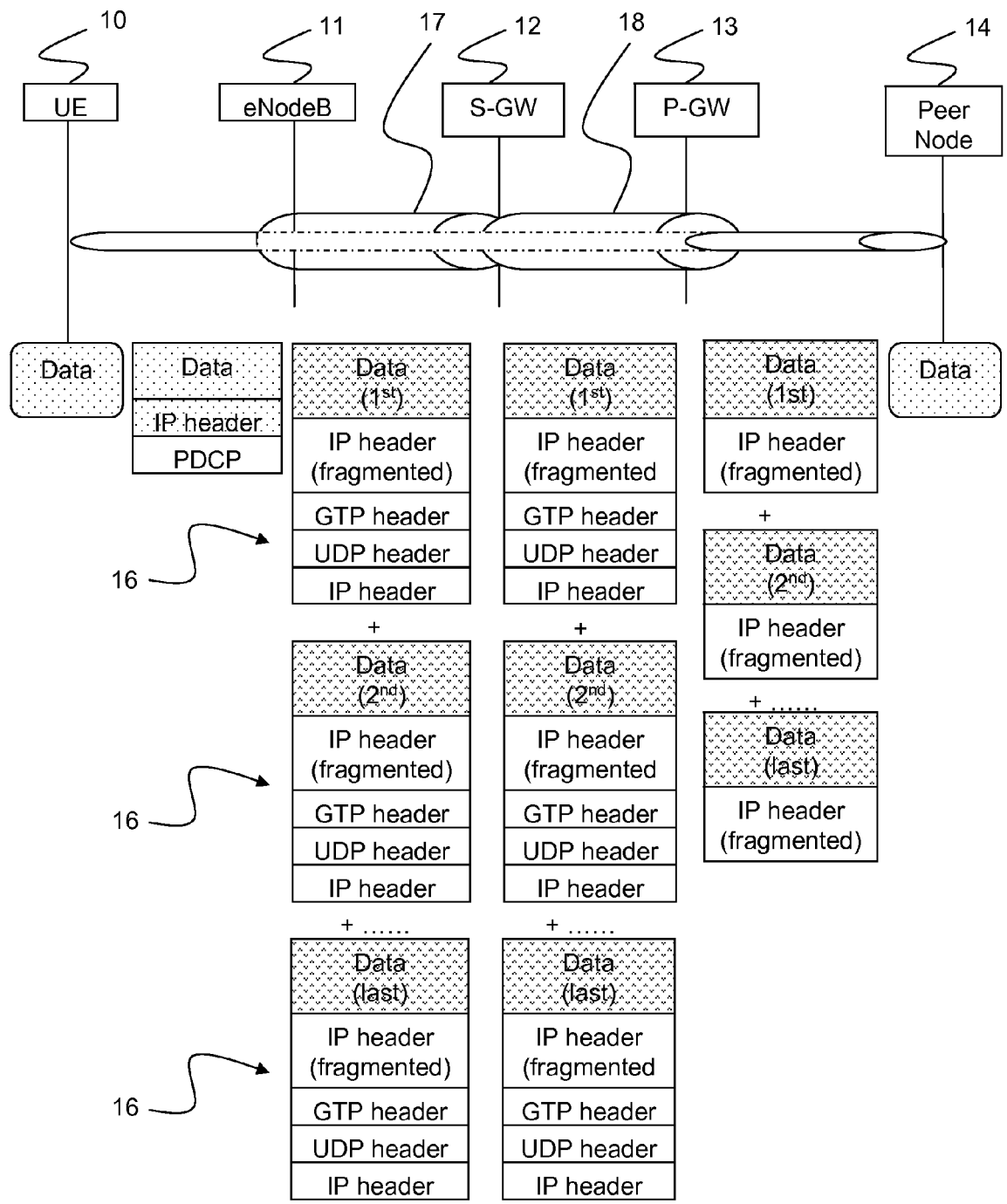
FIG. 3 illustrates data transmission using tunnelled IP fragmentation according to the technology disclosed herein.

As shown in the example of FIG. 3, the tunnel header comprise a GPRS Tunnelling Protocol (GTP) header and/or a tunnelling IP header and/or info about the tunnel header length. The packets are consequently encapsulated to be tunnelled through GTP.

FIG. 3 further illustrates that the second node (being the P-GW in this example) receives fragments at the end of the second tunnel 18. The P-GW then de-encapsulates said fragments and sends said fragments to the PN. The fragments are then reassembled in the PN.

The technology disclosed herein is not limited to the examples above, but may vary freely. For example, FIG. 3 shows a first example of fragmentation according to the technology disclosed herein. As shown, eNodeB 11 fragments and encapsulates the payload to be sent through the tunnels 17 and 18.

An example for uplink data transmissions (from the UE 10 to the Peer Node 14) has been described. A person skilled in the art would realize that the technology disclosed herein also embrace downlink transmissions from the Peer Node to the UE. The P-GW 13 is then capable of fragmenting the payload and encapsulates it to be sent through the tunnels 18 and 17 in the opposite order to the eNodeB. Therefore, even though the example described below refers to eNodeB as the node performing said procedures (uplink), as person skilled in the art would realize that in another embodiment P-GW would take over the role of the eNodeB (downlink).

The first node 11,13 mentioned in the beginning of the detailed description may therefore consist in a base station or a Gateway (GW). In the same way, the second node also named in the beginning may consist a base station or a Gateway (GW). This means that if eNodeB 11 is the first node receiving the large "jumbo" frames, the P-GW 13 is the second node. In the other way around, the P-GW is the first node and eNodeB the second node. The base station consists in an eNodeB and the GW consists in a Packet Data Network GW,(P-GW).

The invention claimed is:

1. A method for improving IP fragmentation and transmission of user payload between a User Equipment (UE) and a Peer Node (PN), the payload being transmitted through a transmission path enabled by at least a first established tunnel and a second established tunnel, said tunnels connecting a first node and a second node in a Packet Core Network (PCN), the method comprising:
the first node fragmenting at least one received payload packet into fragments, wherein each fragment contains a valid IP header and IP data on the basis of a minimum Maximum Transmission Unit (MTU) for an upper IP layer of the transmission path,
the first node encapsulating said fragments at the entry of the first tunnel,
the first node determining the MTU for the upper IP layer of the transmission path on the basis of an MTU of a lower IP layer of the transmission path and on the basis of the size of at least one additional tunnel header for the encapsulated fragments.

2. The method according to claim 1, wherein the MTU is calculated as the MTU of the lower IP layer minus the size of the additional tunnel header.

3. The method according to claim 1, wherein the MTU of the lower IP layer consist in the lowest MTU of the network nodes along the transmission path.

4. The method according to claim 3, wherein the lowest MTU is determined by an MTU discovery procedure.

5. The method according to claim 1, wherein the tunnel header comprises a GPRS Tunnelling Protocol (GTP) header and/or a tunnelling IP header and/or info about the tunnel header length.

6. The method according to claim 5, wherein the packets are encapsulated to be tunnelled through GTP.

7. The method according to claim 1, wherein the packets are fragmented at tunnelled IP level.

8. The method according to claim 1, wherein the fragments are reassembled in the peer node (PN).

9. The method according to claim 1, wherein:
the second node receives fragments at the end of the second tunnel,
de-encapsulates said fragments, and
sends said fragments to the PN.

10. A first node adapted to improve IP fragmentation and transmission of user payload between a User Equipment (UE) and a Peer Node (PN), the payload being transmitted through a transmission path enabled by at least a first and a second established tunnel, said tunnels connecting the first and a second node in a Packet Core Network (PCN),
characterized in that the first node is further adapted: to fragment at least one received payload packet into fragments, wherein each fragment contains a valid IP header and IP data on the basis of a minimum Maximum Transmission Unit (MTU) of an upper IP layer of the transmission path;

to encapsulate said fragments at the entry of the first tunnel; and to determine the MTU of the upper IP layer of the transmission path on the basis a MTU of a lower IP layer in the transmission path and the size of at least one additional tunnel header for the encapsulated fragments.

11. The first node according to claim 10, wherein the first node consists in a base station.

12. The first node according to claim 10, wherein the first node consists in a Gateway, GW.

13. The first node according to claim 11, wherein the base station consist in an eNodeB and the GW consist in a Packet Data Network GW (P-GW).

14. A packet core network (PCN) adapted for improving IP fragmentation and transmission of user payload between a User Equipment UE and a Peer Node (PN), the PCN comprising a first node according to claim 10.

* * * * *

UNITED STATES PATENT AND TRADEMARK OFFICE
CERTIFICATE OF CORRECTION

PATENT NO. : 8,547,979 B2  Page 1 of 1
APPLICATION NO. : 12/980605
DATED : October 1, 2013
INVENTOR(S) : Gu et al.

It is certified that error appears in the above-identified patent and that said Letters Patent is hereby corrected as shown below:

In the Drawings

In Fig. 4, Sheet 4 of 4, in Tag "19", in Line 5, delete "path," and insert -- path. --, therefor.

In Fig. 4, Sheet 4 of 4, in Tag "20", delete " [The first node encapsulates said fragments at the entry of the first tunnel.] " and insert -- [The first node encapsulates said fragments at the entry of the first tunnel.] --, therefor.

In the Specification

In Column 1, Lines 9-10, delete "hereintechnology disclosed herein relates" and insert -- herein technology relates --, therefor.

In Column 2, Line 24, delete "(UE)" and insert -- (UE) and --, therefor.

In Column 3, Line 42, delete "Conergence" and insert -- Convergence --, therefor.

In Column 6, Line 14, delete "GW,(P-GW)." and insert -- GW(P-GW) --, therefor.

Signed and Sealed this
Fifteenth Day of July, 2014

Michelle K. Lee
*Deputy Director of the United States Patent and Trademark Office*